(12) United States Patent
Pike

(10) Patent No.: US 9,322,684 B2
(45) Date of Patent: Apr. 26, 2016

(54) FILTER SIMULATION SYSTEM

(71) Applicant: Argon Electronics (UK) Ltd., Bedfordshire (GB)

(72) Inventor: Steven Pike, Hertfordshire (GB)

(73) Assignee: Argon Electronics (UK) Ltd., Luton, Bedfordshire (GB)

(*) Notice: Subject to any disclaimer, the term of this patent is extended or adjusted under 35 U.S.C. 154(b) by 0 days.

(21) Appl. No.: 14/387,134

(22) PCT Filed: Dec. 4, 2012

(86) PCT No.: PCT/GB2012/052998
§ 371 (c)(1),
(2) Date: Sep. 22, 2014

(87) PCT Pub. No.: WO2013/144534
PCT Pub. Date: Oct. 3, 2013

(65) Prior Publication Data
US 2015/0082914 A1   Mar. 26, 2015

(30) Foreign Application Priority Data

Mar. 27, 2012 (GB) .................................. 1205358.3

(51) Int. Cl.
| | | |
|---|---|---|
| *G01F 1/05* | (2006.01) | |
| *G09B 19/00* | (2006.01) | |
| *G09B 9/00* | (2006.01) | |
| *A62B 9/00* | (2006.01) | |
| *G01F 1/34* | (2006.01) | |
| *A62B 99/00* | (2009.01) | |

(52) U.S. Cl.
CPC .. *G01F 1/34* (2013.01); *G01F 1/05* (2013.01); *G09B 9/00* (2013.01); *G09B 9/003* (2013.01); *G09B 19/00* (2013.01); *A62B 9/006* (2013.01); *A62B 99/00* (2013.01)

(58) Field of Classification Search
CPC ...... A62B 18/02; A62B 18/088; A62B 19/00; A62B 23/025; A62B 27/00; A62B 9/006; G01M 3/24
USPC ...................... 128/202, 206, 201; 73/40, 592
See application file for complete search history.

(56) References Cited

U.S. PATENT DOCUMENTS

| | | | |
|---|---|---|---|
| 5,990,793 A * | 11/1999 | Bieback | 340/573.1 |
| 6,040,777 A | 3/2000 | Ammann et al. | |
| 6,687,910 B1 | 2/2004 | Smallwood | |

(Continued)

FOREIGN PATENT DOCUMENTS

| | | |
|---|---|---|
| GB | 2215216 | 9/1989 |
| WO | WO2004105884 | 12/2004 |

*Primary Examiner* — John Fitzgerald
*Assistant Examiner* — Gedeon M Kidanu
(74) *Attorney, Agent, or Firm* — Stephen T. Scherrer; Monique A. Morneault; Scherrer Patent & Trademark Law, P.C.

(57) ABSTRACT

A filter simulation system that includes a simulation filter (11) with a sensor (13) such that the volume of air passing through the filter can be determined. There is also a control means (16) with stored data relating to level of protection the simulation filter provides against a simulated toxic substance. In this way the filter simulation system can determine whether a correct simulation filter has been selected by a user and whether or not that filter has expired, in which case a dead or incapacitated result can be indicated. In the event of expiry a simulation end of life service indicator (ELSI 22) may be activated.

22 Claims, 2 Drawing Sheets

(56) References Cited

U.S. PATENT DOCUMENTS

| | | | |
|---|---|---|---|
| 7,325,441 B2 * | 2/2008 | Liu et al. | 73/40 |
| 7,587,929 B2 * | 9/2009 | Zielinski et al. | 73/49.8 |
| 8,573,199 B2 * | 11/2013 | King et al. | 128/202.22 |
| 2006/0073447 A1 * | 4/2006 | Bjork et al. | 434/218 |
| 2007/0017509 A1 * | 1/2007 | Emricson et al. | 128/201.24 |
| 2010/0153023 A1 | 6/2010 | Parham | |
| 2012/0055815 A1 * | 3/2012 | Truex et al. | 206/205 |

* cited by examiner

FILTER SIMULATION SYSTEM

TECHNICAL FIELD

The present invention relates to a filter simulation system particularly for use in respirator training.

BACKGROUND ART

During military, police or emergency services training exercises respirator masks are deployed so that personnel can become familiar with the equipment that they will need to protect them from toxic substances in the air.

Gas attack simulation systems exist that utilise a simulator filter in place of the normal filter in a gas mask. Breathing activity may be monitored by the system to determine whether the mask is being worn and a particular user can be designated wounded or killed in the event they do not use the device.

For example, a prior art respirator training systems are described by US2007/0017509 (EMRICSON et al) and CH 692103 A5 (LAZECKI) which rely upon the detection/sensing capability of the training filter to determine a correct fit of the respirator mask. In the case of a noxious substance being reported present in the training exercise, but the respirator is either not being worn or worn correctly, the control system records the individual as dead or incapacitated as appropriate.

US2011/0277759 (CRUTCHFIELD) describes a respirator fit-test method by a combination of an air flow monitor and pressure monitor, however, this is specifically for determining correct fit (i.e. no leaks) and not for wearing as a training aid.

In training situations the type of filter being simulated is, for example, an activated carbon filter which is used in personnel respirators (generally referred to as a canister(s)), vehicle filters and filters for air systems in temporary or permanent buildings. The filtration mechanism may be by adsorption, where the pollutant attaches itself to the activated carbon; and absorption, where the pollutant is absorbed by the activated carbon.

Such filters have a finite capacity to protect in that when the filter layer has been saturated, the noxious substance will then generally pass straight through or, alternatively, the filter layer will become clogged making breathing increasingly difficult for the user downstream of the filter.

For example, some hazardous substances are known to be such that a typical activated carbon respirator filter will only provide 15 minutes protection, rather than the 8 hours that might be expected against more general chemical warfare substances. Particularly, filters designed to provide protection against chemical warfare substances do not generally provide protection against toxic industrial substances.

Some filters have a means of indicating their "end of life" but many do not. An end of life service indicator (ELSI) is a device that is incorporated within a respirator canister to provide a visual indication to the wearer of the remaining service life of a canister. Such technology is in early development and the ideal solution is very much sought after. Some basic ELSIs exist and are in use by various Governments.

In the majority of circumstances, where no "end of life" indicator means is available, the practice is to replace the filter after a prescribed number of hours use. It is however the responsibility of the wearer to decide what constitutes an appropriate number of hours of use, and also to ensure the required number of spare respirator canisters are available.

The prior art (e.g. US2007/0017509) does not address the fact that the filter may not offer adequate protection in a given scenario or that a filter may have "expired" after prolonged use, even if the respirator is correctly worn and the simulation canister correctly fitted. The prior art also tends to be specific to respirators as worn by a human and are not intended for wider applications.

DISCLOSURE OF THE INVENTION

The present invention seeks to address shortcomings in the prior art to provide a general improvement in functionality and effectiveness of known filter simulation systems.

According to a first broad aspect the present invention provides a filter simulation system including: a simulation filter; a sensor; a processing means for determining the volume of air passing through the filter as detected by the sensor; a control means with stored data relating to the level of protection the simulation filter provides against a simulated toxic substance; wherein the concentration of simulated toxic substance within the volume of air calculated by the processing means is comparable to the stored data in the control means for determining whether the simulation filter has ceased to be effective and, if the control means determines that the simulation filter has ceased to be effective, then the user is able to be indicated or recorded as dead or incapacitated.

The level of protection provided against the simulated toxic substance is generally related to the capacity of the simulated system (e.g. simulation filter unit) to adsorb a simulated toxic substance at a determined concentration over a period of time. The simulation filter can be deemed to have ceased being effective depending on the determined concentration of the simulated toxic substance in the air, the capacity of the simulated filter (some filters may be rated to withstand higher cumulative concentration than others) and the volume of air processed by the filter (which relates to the breathing patterns of an individual user, or in the case of a vehicle, the airflow rate of the filtration system). The simulation filter may also be deemed not to be effective if the wrong type of simulation filter is employed compared to the threat substance being simulated, or it is worn incorrectly.

In a second aspect the invention also provides a method of implementing a simulation filter system according to the first aspect above, wherein a central control means monitors a plurality of simulation filters and is able to display kill or incapacitated data for users determined from the simulation filter user data collected.

The processing and control means (which may include a writable memory) may be part of one CPU and/or integrated into a housing of the simulation filter and/or maintained by a central control computer that collates and displays data collected from a plurality of simulation filters used with the simulation filter system, or a combination of the two.

In a preferred form of the invention the central control computer of the system communicates with the simulation filter via a wireless link.

Preferably the simulation filter includes a tag or other form of electronic or non electronic identification means. In this way the control means can determine whether a correct simulation filter has been selected for the simulated hazard in the training scenario.

It is preferable that the use of any ELSI technology is simulated where appropriate, together with a means to change the indication as appropriate and reset the indication to permit the simulation filter to be re issued. It is also preferable for the system to monitor if a user tries to fit and use a simulation filter that has a life expired indication activated.

The ability to determine that a filter has been replaced by implementing a means of detecting different training filters (i.e. a means of uniquely identifying specific filters, or at least differentiating between a filter that had been fully or partially used from one that had not been used) permits the correct implementation of this procedure to be monitored.

Filter technology must be tailored to protect against specific types or groups of threat, therefore, in a training situation, as has been observed in the present invention, it is important to test that a correct filter or filter arrangement (because in some instances a secondary clip on filter is added to the primary filter) has been chosen (for the simulated event) because, in a real world scenario, selection of the wrong filter type or a filter that has an expired or partially expired life could be fatal.

In a preferred form the filter simulation system is able to determine at which point (e.g. after specified duration, after a specific volume of air has passed through the filter, or after a cumulative concentration of toxic substance has passed into the filter over time) the protection of the filter ceases, which exposes the user to harm, thereby enabling that user to be recorded as incapacitated or killed.

The processor is able to determine the concentration of the simulation threat within the air passing through the simulation filter, and therefore calculate the concentration of simulated threat substance adsorbed by the simulation filter over time. As such, the processor memory will contain data relating to the level of simulated protection a specific simulation filter provides against a specific simulation threat, and by using this data is able to determine when the simulation filter ceases to be effective.

The calculation result obtained that determines the remaining simulation protection provided by the simulation filter can be used to activate a simulation ELSI (End of Life Service Indicator). By using such an indicator or other means of determining the remaining capacity of the simulation filter, a dead or incapacitated result may never eventuate, i.e. because the user is changing the simulation filter regularly and thereby being successful in the training scenario.

Once the simulated concentration of the simulated threat substance has been determined, and the effectiveness of the simulation filter with respect to the simulated threat substance is known, it is possible to calculate the concentration of simulated threat substance that the individual(s) being protected by the simulation filter will be exposed to once the simulation filter ceases to be effective.

The memory within the processor system is also able to contain data relating to the effect/lethality of a particular substance to a human, for example the concentration at which incapacitation or death occurs. This lethality data can be used with the data relating to the simulated concentration of simulated threat substance to calculate the degree of simulated incapacity or the point of simulated death of the person(s) for who the simulated protection has ceased to be effective.

The key considerations, as recognised by the present invention, are that the appropriate protective filter needs to be installed for the threat that exists, and that the level of protection is finite meaning the protective filter has to be replaced after a certain time, and that the replacement filter itself must be appropriate for the simulated threat present and have a serviceable life. The result of these considerations, according to the invention, is a more realistic simulation scenario and higher quality of training.

In alternative forms of the invention there may be more than one simulation filter (in the system or within a single mask) and, in such a case, the central control means of the system must monitor all filters because all filters must be serviceable in order to provide the required respiratory protection.

Some known filter canisters or modules also include a particulate filter to protect against general dust, radioactive gas/debris and biological spores. These particulate filters become clogged over time as they are used resulting in a reduced airflow, which in turn results in greater effort on the part of the respirator wearer (in the case of a respirator canister) to inhale. Therefore, according to one form of the invention, there is scope to restrict airflow through the simulation filter such that the user experiences difficulty in breathing, or to completely cut off the airflow to inhibit the ability to breathe thus causing the respirator to be removed by the wearer to simulate discomfort as if affected by toxin.

The means of restricting airflow could be a gradual restriction of an air passage, such as overlapping plates with an aligned series of holes that are gradually moved (by automated means) out of alignment, or a flexible air tube with a slow moving clamp arrangement that gradually reduces the cross section area of the tube, hence inhibiting breathing therethrough.

The sensor means may be a pressure difference measurement between two sides of the simulation filter or an air flow sensor located in an air path of the simulation filter.

According to US2007/0017509 and CH692103, by monitoring the rate of pressure difference or airflow the volume of air being inhaled can be determined. However, according to the present invention, this information is also used to determine expiration of filter life in relation to the filter's simulated protection. The appropriateness of the filter for the substance present can also be determined by tagging means.

MODE(S) FOR CARRYING OUT THE INVENTION

Figure 1:
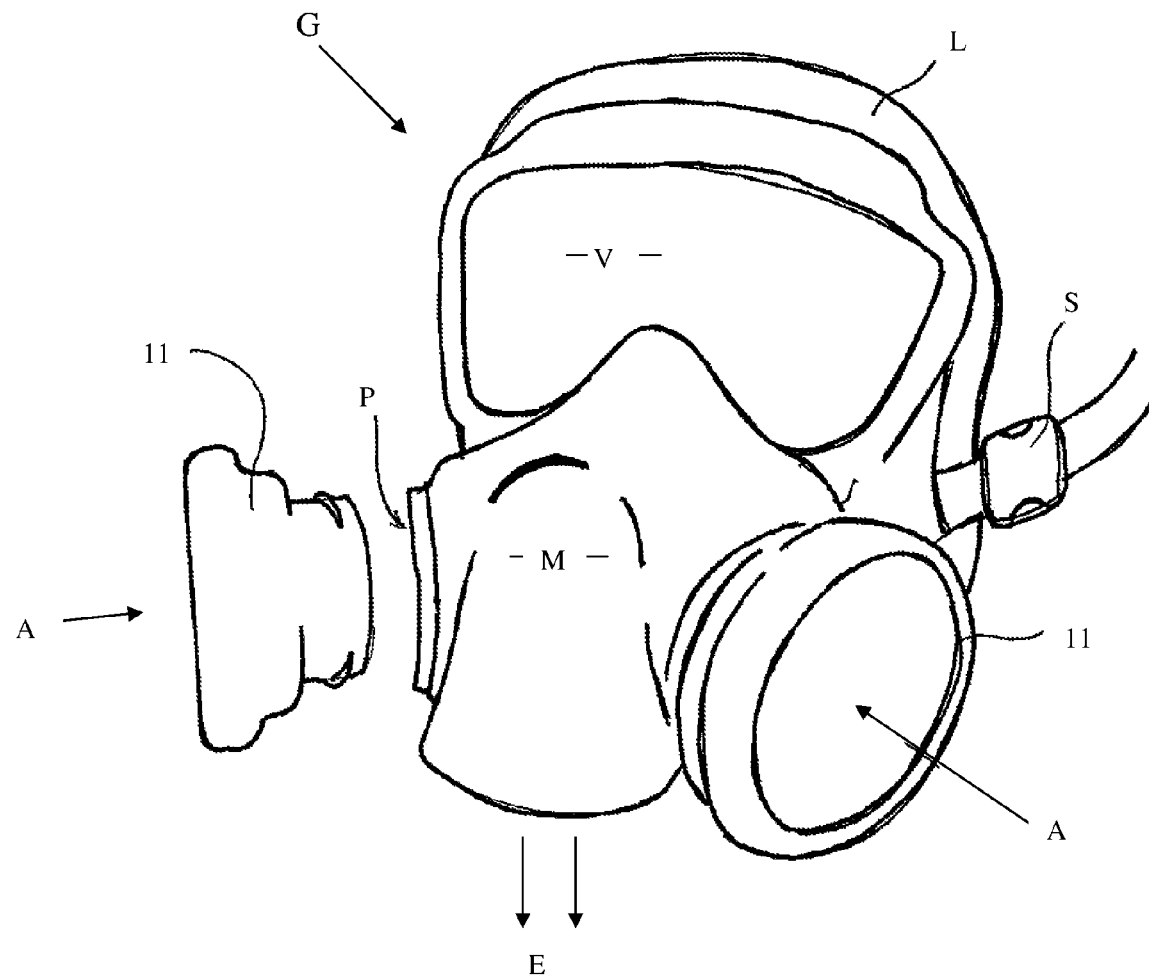
FIG. 1 illustrates an overview of a respirator mask fitted with a simulation filter according to the invention.

Referring to FIG. 1, a gas mask G typically features a visor V and a mouth/nose covering M that encloses a user's face and isolates the airways from the atmosphere. A strap S or other fixing means is employed to secure the mask on a user's head. The mask should be fixed tightly such that there is no ingress of ambient air around seal L which is pressed against the user's skin or headdress.

According to the present invention a simulation filter unit 11 is coupled to the regular air filter port P of the gas mask G. In the illustrated form of gas mask G there are two filter units 11 where intake air A is breathed by a user and exhaled (denoted by letter E) via a one way valve (not illustrated) located within the mask G. This operation is familiar to those skilled in the art.

The system (e.g. centrally monitored) will preferably determine if one or more simulation filter canisters are installed.

Figure 2:
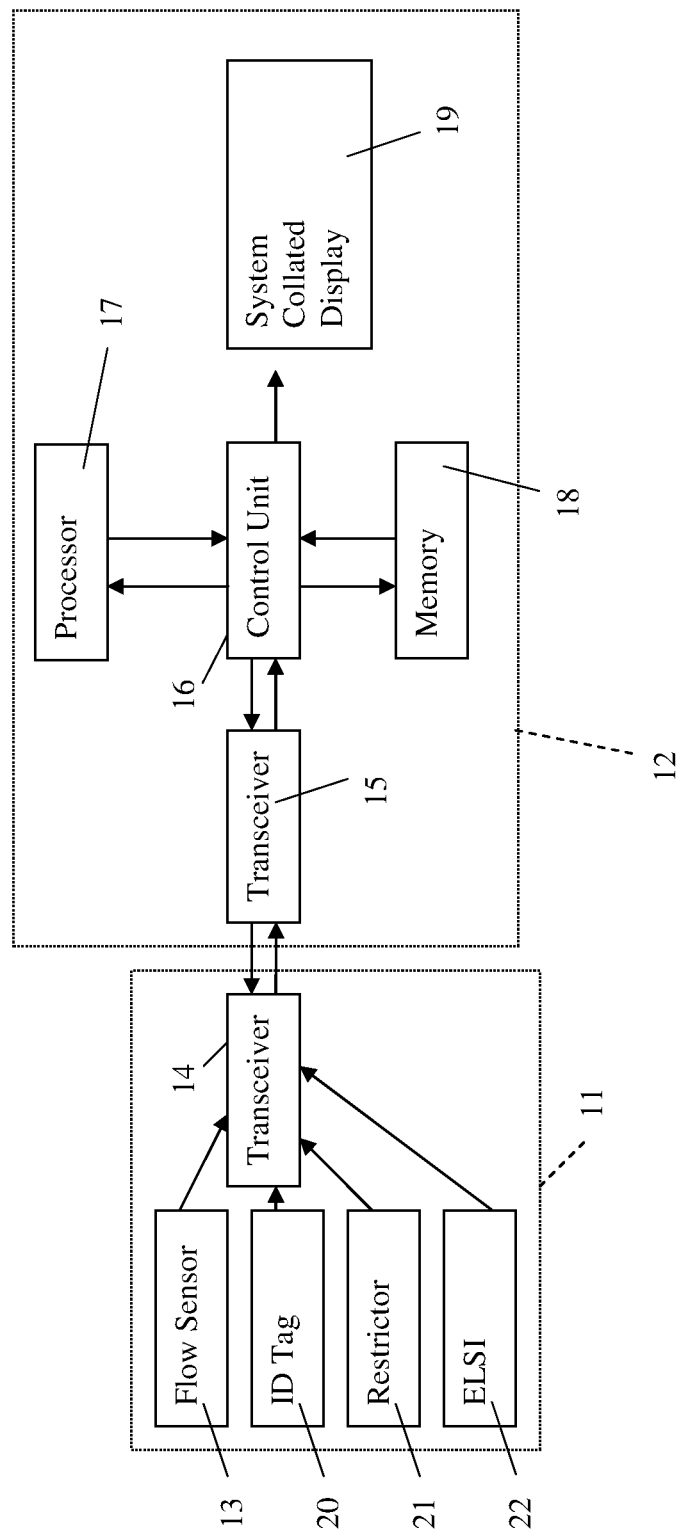
FIG. 2 illustrates the filter simulation system as a functional block diagram according to the invention.

FIG. 2 illustrates a block diagram of functional features of the invention. Simulation filter 11 is shown to include air flow sensor 13 and a transceiver 14 (or it may be a one-way transmitter) for transmitting air flow data from the sensor 3 to a central control means 12.

Information is received by a control transceiver 15 and managed by the control unit 16 which will have processor 17 and memory 18 functions. Collated data of the simulation exercise is viewable in a display 19.

According to the invention, the air flow data is used to calculate the volumetric airflow of a user and hence determine breathing characteristics. This information can alert the system not only to whether a user is actually breathing through the filter 11, but also when used in conjunction with data relating to the simulated threat and concentration of that simulated threat to how long the filter can be safely used. In the event the simulation filter ceases to be effective, the information is also used to determine and record the effect of the simulated breakthrough of the toxic substance on the individuals(s) protected by the simulation filter, e.g. incapacitation or death.

The sensor or sensing means may operate according to pressure difference across the filter or as an air flow meter measuring the speed of air through a tube. It should be clear that "air flow sensor" (singular) could also encompass the use of multiple sensors, especially where pressure difference is required to be measured.

FIG. 2 also shows an ID Tag 20 functional block in the simulation filter 11. This represents the ability to tag and identify a simulation filter with particular use characteristics. For example, the filter can be tagged as an activated carbon filter of a particular grade or intended use and the control system can then decide whether the correct filter has been utilised to protect against the simulated threat. Furthermore, the duration of use of that particular filter can be recorded such that, if overused, the user can either be warned or noted as dead or incapacitated. In the event that an end of life service indicator (ELSI) is to be included (denoted as 22 in FIG. 2), the status of this indicator can also be simulated.

An ID tag 20 or other memory means within the filter 11 can be reset following completion of a training exercise or during a training exercise upon authorisation from a central control means. The ELSI simulator 22 can also be subject to reset.

A restrictor 21 is illustrated in FIG. 2 to represent implementation of an air-flow restriction means in filter 11 to simulate a clogged filter after prolonged use. Such a system can be activated by the control means through monitoring of the duration of use or other environmental factors. This feature is further discussed under point 6 below.

It will be apparent that the air flow sensor 13 could be located within the port P (or indeed at exhale) of gas mask G, however, it is expected that gas mask G would otherwise be a conventional in-service gas mask so it is preferable to keep the training functionality within the simulation filter unit 11 itself.

While the preferred form of communication between filter 11 and the control system is wireless (Infra Red, radio etc), other wired forms of connection may be possible. Also, some or all of the control system could be located in the filter or on a service pack worn by the user which is queried during by means of a remote communications and exercise control system or only after completion of the training exercise. It should therefore be noted that the simulation filter functional block 11 in FIG. 2 may also include its own processing/control means to manage the transceiver and the functions of any of the flow sensor, ID tag or restrictor.

In a further form of the invention, a layer of activated carbon or other appropriate medium may be integrated into the simulation filter 11 in order to remove the general sense of smell of a user since this is a common effect of normal respirator devices. This feature is further discussed in point 8 below.

According to the invention, a simulation canister/filter (and/or the system as a whole) is able to simulate the protection provided by a real canister in relation to a simulation threat. For example, the simulation canister is able to determine the actual threat substance present and the concentration of that threat substance. Having derived this information (which, in practice, would be determined from a simulated threat substance signal sent from a controller of the training exercise, i.e. control unit 16) the capacity of the simulated filter to provide protection can be determined. This then enables the following aspects to be implemented according to the invention:

1. Determine that the canister fitted is correct for the threat that is present.
2. Determine the duration of protection versus concentration of threat agent present.
3. Determine the health consequences of simulated breakthrough to the individual(s) being protected such as incapacity or death.
4. Provide a means of determining if the simulated protection of the canister has ceased to be effective, i.e. the filter has reached the end of its life.
5. A means to determine if the simulated canister(s) has been replaced with a fresh canister once end of life has been reached in order to provide continued protection to the wearer. For this to be possible, each simulated filter requires a means of specific identification via the ID tag or an internal memory. A "fresh" canister could be a command reset canister, but physical removal and replacement of a canister should be encouraged to simulate real-world scenarios.
6. In a preferred form of the invention there is a means of restricting the airflow into the respirator to simulate a filter being clogged. When used in environments that are high in dust and sand it is possible that as the wearer inhales dust and sand can collect at the intake of the filter and/or clog the particulate filter within the simulated canister. It can be noted that US2007/0017509 refers to the ability to vary air resistance to simulate a real filter; however, this resistance is in essence selected by means of a tube installed and is not variable according to the intent of the present invention.
7. In connection with 6 above, means of closing the airflow through the respirator to force the wearer to have to remove the respirator hence providing a degree of simulated psychological shock.
8. The simulation filter should preferably include a layer of activated carbon incorporated for the purpose of preventing the wearer from being able to smell odours present within the training environment. It is noted that existing simulation filters do not have this feature. In a genuine filter, the activated carbon has the effect of removing the wearer's sense of smell. If a training respirator does not include some element of activated carbon to eliminate external odours this can reduce the realism of the training.
9. A means of communicating the health of a trainee based upon the effectiveness of the simulation filter for the simulated threat present.
10. A means of communicating the status of the simulation canister and how it is being used back to a central control monitoring system either by wire or wirelessly.
11. A means of simulating an end of life service indicator (ELSI), the status of said indicator and a means to reset said indicator.

INDUSTRIAL APPLICABILITY

The primary embodiment as described above is a simulation filter for use in respirator masks, however, the system of the invention is equally applicable to vehicle and building filters. The same parameters of use exemplified by the invention apply to such filters, i.e. monitoring duration of use to determine expiry of a filter and detecting whether a filter is fit for purpose via an ID tag or the like.

The present invention resulted from the fact that some organisations have a requirement for higher quality training than can be accommodated by a simulation system of the type described by US2007/0017509. There is a need for more functionality in the simulation to result in more effective training for a higher level of safety in a real-world event.

The invention claimed is:

1. A filter simulation system including:
a simulation filter;
a sensor;
a processor for determining the volume of air passing through the filter as detected by the sensor;
a controller with stored data relating to the level of protection the simulation filter provides against a simulated toxic substance;
wherein the concentration of simulated toxic substance within the volume of air calculated by the processor is comparable to the stored data in the controller for determining whether the simulation filter has ceased to be effective and, if the controller determines that the simulation filter has ceased to be effective, then the user is able to be indicated as dead or incapacitated.

2. The filter simulation system of claim 1 wherein the controller has further stored data relating to the nature and/or type of the simulated toxic substance.

3. The filter simulation system of claim 1 wherein the sensor measures a pressure differential across the simulation filter.

4. The filter simulation system of claim 1 wherein the sensor is an air flow sensor.

5. The filter simulation system of claim 1 wherein any of the sensor, the processor, the controller and/or a memory is integrated into the simulation filter.

6. The filter simulation system of claim 1 wherein a transmitter is associated with the sensor to transmit data to a central control station.

7. The filter simulation system of claim 1 wherein the simulation filter includes an adjustable breathing restrictor to simulate clogging or complete blockage of a filter.

8. The filter simulation system of claim 1 wherein the sensor is located downstream of a user's exhalation.

9. The filter simulation system of claim 1 wherein the controller is able to determine if a user has replaced a simulation filter and whether the replacement was timely in order to maintain protection from the simulated toxic substance.

10. The filter simulation system of claim 1 wherein the simulation filter is adapted for personal, vehicle, or building implemented use.

11. The filter simulation system of claim 1 wherein the simulation filter includes a layer of activated carbon.

12. The filter simulation system of claim 1 wherein the simulation filter has an identifier to identify a type/grade of simulation filter as suitable for a particular simulated toxic substance or family of simulated substances.

13. The filter simulation system of claim 12 wherein the controller checks whether a correct simulation filter is being used to match the type/grade of toxic substance simulated in a training exercise.

14. The filter simulation system of claim 13 wherein the controller further checks whether a particular simulation filter is fully or partially used.

15. A method of implementing a simulation filter system according to claim 1 wherein a central control station monitors a plurality of simulation filters and is able to display kill or incapacitated data for users determined from the simulation filter user data collected.

16. The method of claim 15 wherein the central control station has the ability to simulate an end of life service indicator such that the manner in which an actual end of life indicator operates is simulated so that the user can visually determine end of life and/or remaining life.

17. The method of claim 15 wherein the central control station is able to determine, via an identifier for each simulation filter in the system, whether:
a simulation filter has expired; and/or
a replacement simulation filter has acceptable usable life remaining; and/or
to confirm a simulated filter selected for use is appropriate for the simulated threat present.

18. The method of claim 17 wherein the central control station has the ability to reset a simulated filter to unused state and/or modify its type.

19. A simulation filter device incorporating a filter simulation system of claim 1, suitable for a protective mask, vehicle or building, wherein the sensor is able to detect the volume of air flow passing through the simulation filter and the controller is able to determine the duration of protection versus concentration of simulated toxic substance for comparison to stored data to activate a simulated end of life indicator so that the user can visually determine end of life and/or remaining life.

20. The device of claim 19 further including an identifier such that the controller can determine if a correct simulation device has been selected based on the predetermined simulated threat situation.

21. The device of claim 19 wherein the sensor measures a pressure differential or is an air flow meter.

22. The device of claim 21 wherein a volumetric air flow rate is determined by the controller from measurements taken from the pressure differential sensor or the air flow meter.

* * * * *